A. M. BILLINGS.
WRENCH.
No. 7,899. Patented Jan. 14, 1851.
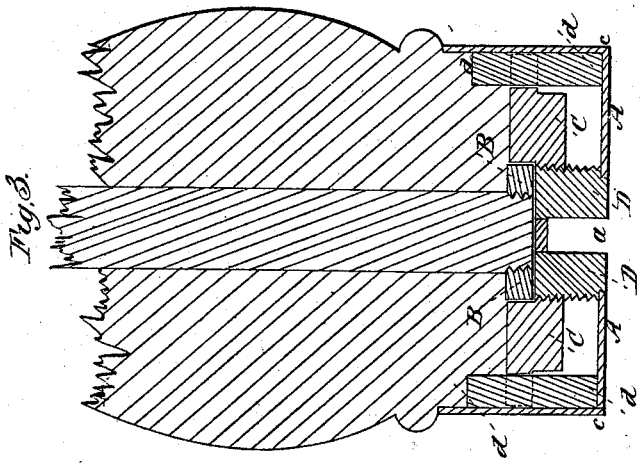
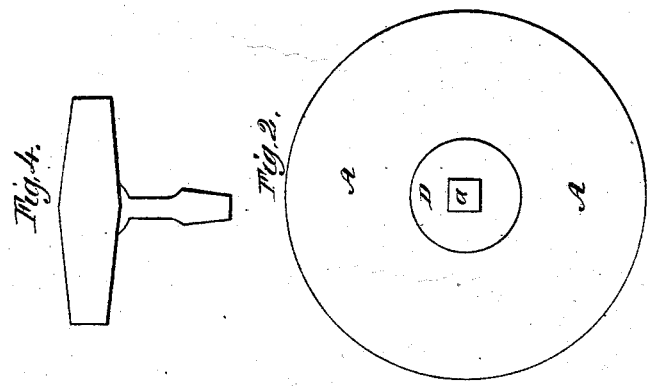
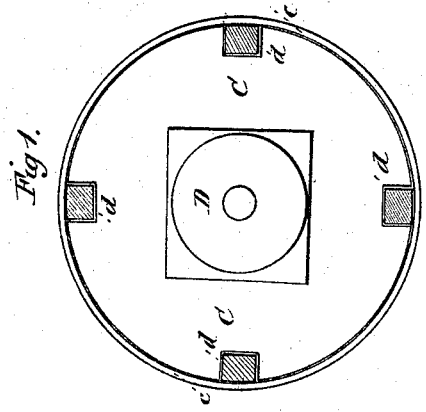

UNITED STATES PATENT OFFICE.

A. M. BILLINGS, OF CLAREMONT, NEW HAMPSHIRE.

CONNECTING AND DISCONNECTING HUBS AND AXLES.

Specification of Letters Patent No. 7,899, dated January 14, 1851.

*To all whom it may concern:*

Be it known that I, A. M. BILLINGS, of Claremont, in the county of Sullivan and State of New Hampshire, have invented a new and Improved Method of Detaching a Wheel from its Axletree; and I do hereby declare that the following is a full and exact description thereof, reference being had to the accompanying drawings and to the letters of reference marked thereon, making a part of this specification.

Similar letters indicate like parts in each figure.

Figure 1, represents a view of the interior of my apparatus, or a back view. Fig. 2, a front view. Fig. 3, a transverse section, and Fig. 4, a key.

The nature of my invention consists in detaching a wheel from its axle by means of the plate C, C, acting as a wrench, the top of which is shown in Fig. 1, and a section of the same in Fig. 3. The key Fig. 4, is applied to the screw D, D, at *a*, which in revolving, moves the plate C, C, until it fits upon the nut B, B, Fig. 3.

The screw D, D, is attached to and revolves in the end of the box A, being set in the plate by a shoulder. B, B, Fig. 3 is the nut to be unscrewed. The plate C, C, is moved by the screw D, D, so that it fits exactly upon the nut, B, B, in which position it is represented in Fig. 3. The wheel is then turned so as to unscrew the nut, by which means it is then detached from the axle. When the wheel is replaced, the plate C, C, is again drawn back by means of the screw D D bringing the top surface of the plate C, C, on a line with the end of the screw D, in which position it is retained.

Inside the box containing my apparatus which is attached to the hub of the wheel by screws, are four guides *d, d, d, d*, to keep in place the plate C C when moved by the screw D, and when acting as a wrench.

What I claim as my invention and desire to secure by Letters Patent, is—

My device for detaching a wheel from its axletree, by means of the plate C C acting as a wrench for unscrewing the nut B, which holds the wheel to the axle, said plate being advanced and withdrawn by the screw D, substantially in the manner herein described.

A. M. BILLINGS.

Witnesses:
 JOHN I. PRENTISS,
 G. W. REDFIELD.